United States Patent
Chen et al.

(10) Patent No.: US 7,859,761 B2
(45) Date of Patent: Dec. 28, 2010

(54) ILLUMINATION SYSTEM

(75) Inventors: Yi-Hsueh Chen, Hsinchu (TW);
Sung-Nan Chen, Hsinchu (TW);
Keng-Han Chuang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/857,594

(22) Filed: Sep. 19, 2007

(65) Prior Publication Data

US 2008/0239447 A1 Oct. 2, 2008

(30) Foreign Application Priority Data

Apr. 2, 2007 (TW) ............................... 96111599 A

(51) Int. Cl.
*G02B 27/14* (2006.01)
(52) U.S. Cl. ..................... 359/637; 359/629; 359/634
(58) Field of Classification Search ............... 359/629, 359/634, 637
See application file for complete search history.

(56) References Cited

U.S. PATENT DOCUMENTS

| | | | |
|---|---|---|---|
| 5,729,374 A | 3/1998 | Tiszauer et al. | |
| 7,030,383 B2 | 4/2006 | Babayoff et al. | |
| 2002/0124971 A1* | 9/2002 | Koerner et al. | 157/1 |
| 2005/0237490 A1* | 10/2005 | Hibi et al. | 353/30 |
| 2006/0097178 A1* | 5/2006 | Babayoff et al. | 250/370.08 |
| 2006/0126022 A1* | 6/2006 | Govorkov et al. | 353/31 |
| 2006/0221429 A1* | 10/2006 | Christensen et al. | 359/279 |
| 2008/0106779 A1* | 5/2008 | Peterson et al. | 359/259 |

FOREIGN PATENT DOCUMENTS

JP 63100461 A * 5/1988

* cited by examiner

*Primary Examiner*—Jessica T Stultz
*Assistant Examiner*—Mahidere S Sahle
(74) *Attorney, Agent, or Firm*—J.C. Patents

(57) ABSTRACT

An illumination system including a coherent light source and a speckle-reducing module is provided. The coherent light source is adopted for providing a light beam. The speckle-reducing module is disposed at an optical path of the light beam. The speckle-reducing module includes a rotator, a carrier and an optical path adjusting member. The rotator is adopted for rotating on a reference plane about a spindle axis passing through the rotator. The spindle axis is substantially perpendicular to the reference plane. The carrier is disposed at the rotator. The optical path adjusting member is disposed at the carrier and at the optical path of the light beam. The optical path adjusting member has an incident surface inclined at an angle with respect to the reference plane.

3 Claims, 6 Drawing Sheets

ILLUMINATION SYSTEM

CROSS-REFERENCE TO RELATED APPLICATION

This application claims the priority benefit of Taiwan application serial no. 96111599, filed on Apr. 2, 2007. All disclosure of the Taiwan application is incorporated herein by reference.

BACKGROUND OF THE INVENTION

1. Field of the Invention

The present invention generally relates to a projection apparatus, in particular, to an illumination system of a projection apparatus.

2. Description of Related Art

Referring to FIG. 1 a conventional illumination system 100 of a projection apparatus includes a laser light source 100, a lens group 120 and a reflecting mirror 130. The laser light source 110 is used for providing a light beam 112. The lens group 120 is disposed at a transmission path of the light beam 112 for condensing the light beam 112. The reflecting mirror 130 is disposed at the transmission path of the light beam 112 for reflecting the light beam 112 to a light valve 50 of the projection apparatus.

Because the light beam 112 provided by the laser light source 110 easily occurs interference, speckle patterns are frequently occurred on the light valve 50 when the light-beam 112 is projected onto the light valve 50. This is the so-called speckle noise. To reduce the speckle noise, an actuator (not drawn) is used in the conventional technique to drive the reflecting mirror 130 into swinging motion between angles of ±θ about an axis. Hence, the location of the light beam 112 projected on the light valve 50 is changed and speckle noise is reduced. However, because the reflecting mirror 130 is allowed to swing with respect to only one axial direction, the range of variation of the location of the light beam 112 on the light valve 50 is quite limited. As a result, the effect on lowering the speckle noise is also limited.

The conventional technique also includes a method of driving the reflecting mirror 130 to swing in two mutually perpendicular axes. Setting the reflecting mirror 130 to swing in two axial directions is capable of increasing the range of variation of the location of the light beam 112 on the light valve 50 and obtaining better speckle noise reduction. However, setting the reflecting mirror 130 to swing in two axial directions normally requires two actuators and a more complicated control circuit. Therefore, the fabrication cost is increased.

SUMMARY OF THE INVENTION

Accordingly, the present invention is directed to an illumination system capable of reducing speckle noise.

According to an embodiment of the present invention, an illumination system is provided. The illumination system including a coherent light source and a speckle-reducing module. The coherent light source is adopted for providing a light beam. The speckle-reducing module is disposed at an optical path of the light beam. The speckle-reducing module includes a rotator, a carrier and an optical path adjusting member. The rotator is adopted for rotating on a reference plane about a spindle axis passing through the rotator. The spindle axis is substantially perpendicular to the reference plane. The carrier is disposed at the rotator. The optical path adjusting member is disposed at the carrier and at the optical path of the light beam. The optical path adjusting member has an incident surface inclined at an angle with respect to the reference plane.

In the illumination system of the present invention, when the carrier rotates with the rotator, the optical path adjusting member disposed on the carrier also rotates. Because the carrier is inclined at the angle with respect to the reference plane, the location of the light beam projected on the light valve varies along a circular trace and the incidence angle of the incident light varies accordingly when the optical path adjusting member rotates. Because the range of variation along the circular trace is larger and the incidence angle of the incident light is different in different locations, the illumination system of the present invention can reduce speckle noise more effectively.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "right," "left," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "surrounded," and variations thereof herein are used broadly and encompass direct and indirect surroundings. Accordingly, the drawings and descriptions will be regarded as illustrative in nature and not as restrictive.

First Embodiment

Figure 1:
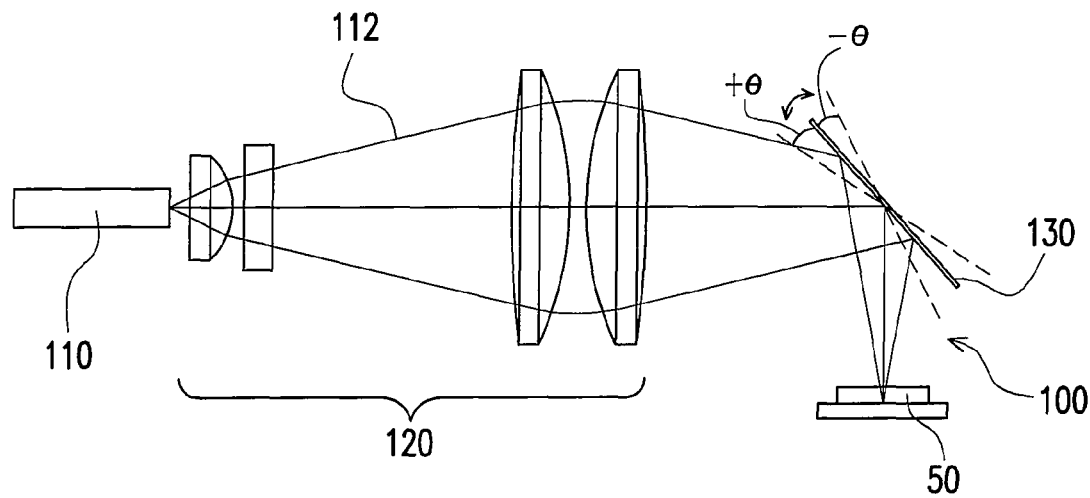
FIG. 1 is a schematic view of a conventional illumination system.
Figure 2:
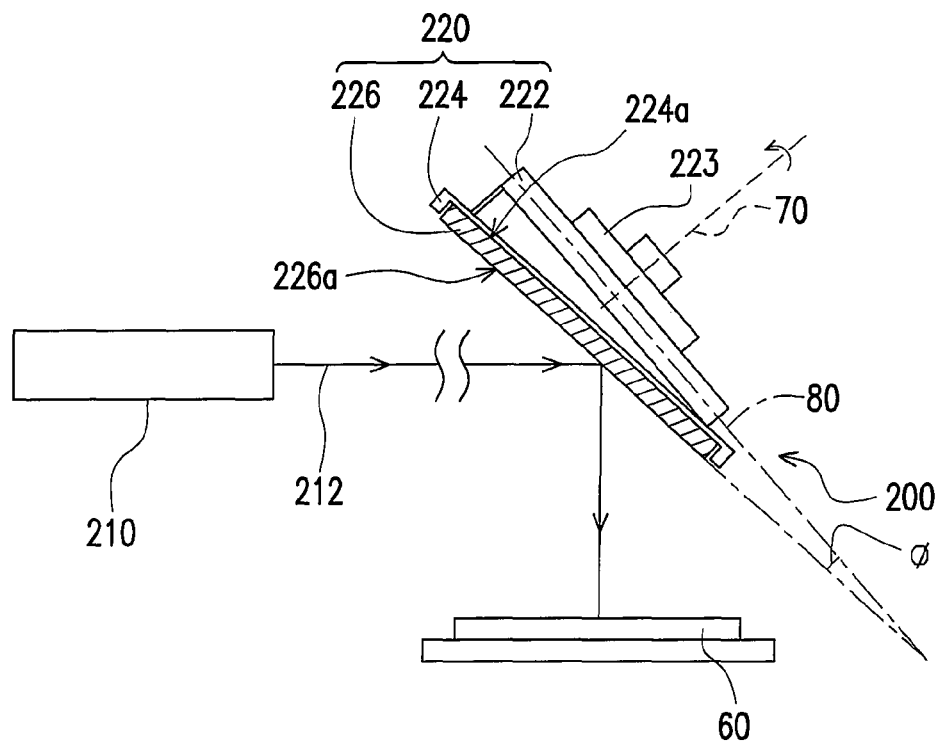
FIG. 2 is a schematic view of an illumination system according to a first embodiment of the present invention.

Referring to FIG. 2, the illumination system 200 is capable of being applied to a projection apparatus. The illumination system 200 includes a coherent light source 210 and a speckle-reducing module 220. The coherent light source 210 is adopted for providing a light beam 212. The speckle-reducing module 220 is disposed at an optical path of the light beam 212. The speckle-reducing module 220 includes a rotator 222, a carrier 224 and an optical path adjusting member 226. The rotator 222 is adopted for rotating on a reference plane 80 about a spindle axis 70 passing through the rotator 222. The spindle axis 70 is substantially perpendicular to the reference plane 80. The carrier 224 is disposed at the rotator 222. The optical path adjusting member 226 is disposed at the carrier 224 and at the optical path of the light beam 212. The optical path adjusting member 226 has an incident surface 226a and the incident surface 226a is inclined at an angle φ with respect to the reference plane 80.

The coherent light source 210 is a laser light source, for example, but is not limited as such. In addition, the rotator 222 is a turntable of a motor 223, for example. The carrier 224 has a carrier surface 224a. The optical path adjusting member 226 is disposed on the carrier surface 224a. The optical path adjusting member 226 is a reflecting member, for example. The incident surface 226a is a reflecting surface of the reflecting member. Furthermore, the inclined angle φ of the incident surface 226a of the optical path adjusting member 226 with respect to the reference surface 80 is greater than 0° and smaller than 1°, for example, but is not limited as such.

After the light beam 212 passes through other optical members (for example, color wheel, integration rod and lenses) of the illumination system 200, the light beam 212 provided by the coherent light source 210 is transmitted to the optical path adjusting member 226. The optical path adjusting member 226 reflects the light beam 212 to a light valve 60 of the projection apparatus.

Figure 3:
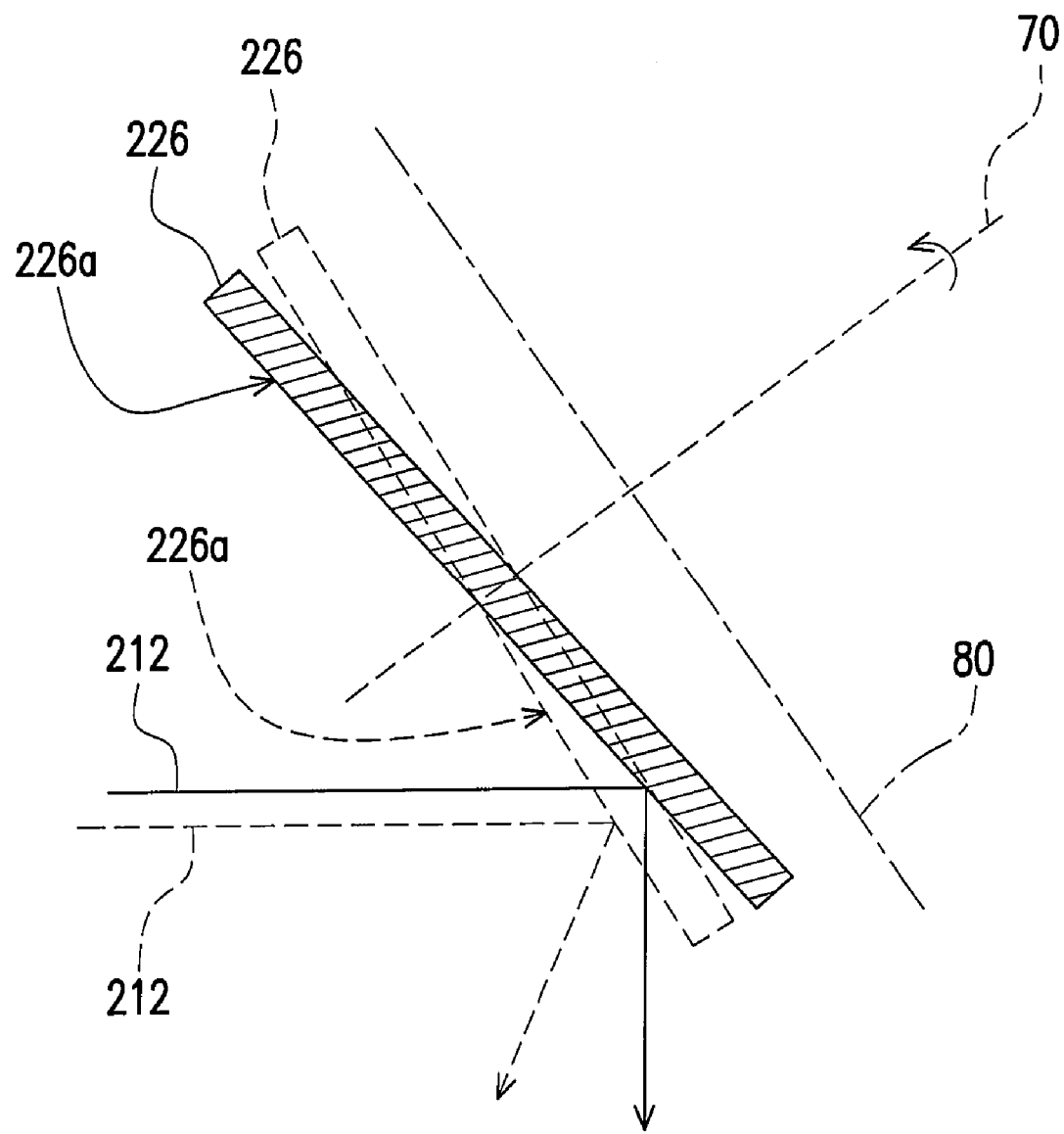
FIG. 3 is a diagram showing the rotation of an optical path adjusting member in FIG. 2.

As shown in FIGS. 2 and 3, the carrier 224 is inclined at the angle with respect to the reference plane 80 in the present embodiment, so that the incident surface 226a of the optical path adjusting member 226 disposed on the carrier 224 is also inclined at the angle with respect to the reference plane 80. When the motor 223 rotates, the carrier 224 disposed on the rotator 222 rotates with the rotator 222 and the optical path adjusting member 226 disposed on the carrier 224 also rotates with the carrier 224. In addition, when the optical path adjusting member 226 rotates with the carrier 224, the incidence angle of the light beam 212 with respect to the incident surface 226a of the optical path adjusting member 226 changes. At the same time, the reflection angle of the light beam 212 reflected by the optical path adjusting member 226 also changes. In other words, the reflecting angles of the light beam 212 reflected by the optical path adjusting member 226 are different. Consequently, the location of the light beam 212 projected on the light valve 60 is changed so as to reducing speckle noise.

Figure 4:
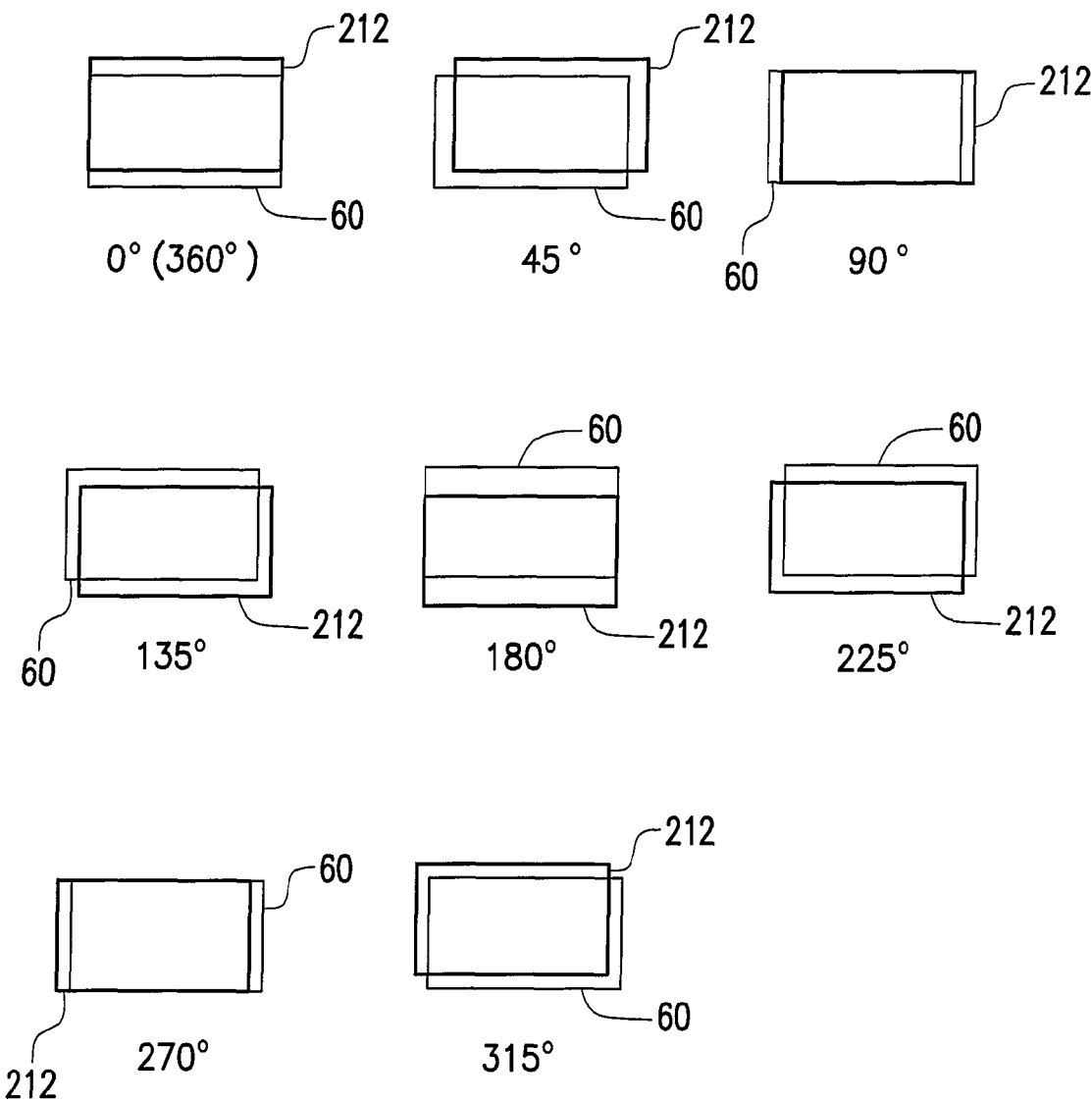
FIG. 4 contains diagrams showing the locations of a light beam projected on a light valve when the optical path adjusting member is rotated to different angles.

FIG. 4 shows the locations of the light beam 212 projected on the light valve 60 when the optical path adjusting member 226 rotates to angles 45°, 90°, 135°, 180°, 225°, 270°, 315° and 360°. As shown in FIG. 4, the location of the projected light beam 212 on the light valve 60 follows a roughly circular trace when the optical path adjusting member 226 rotates. Moreover, the incidence angles of the light beam 212 projected to different locations of the light valve 60 are different. Therefore, the range of variation of the location of the light beam 212 projected on the light valve 60 is larger. Furthermore, the light reflected by the light valve 60 also shows angular variation characteristics so that speckle noise reduction is more effective. If the ratio of the standard deviation of the brightness at various locations on the light valve 60 divided by the mean of the brightness is used as a measure for the speckle noise, the measured value without applying any method to reduce the speckle noise is 28.73%. When the illumination system 200 having the inclined angle φ equal to 0.3° is used, the measured value is 14.14%. Therefore, the efficiency of the illumination system 200 for reducing the speckle noise is about 50.78%.

In addition, the illumination system 200 of the present embodiment reduces interference fringes. Moreover, the present embodiment only requires the rotation of one actuator (i.e. motor 223) and there is no need for a complicated control circuit. Thus, the fabrication cost is effectively reduced. It should be noted that the inclined angle φ of the incident surface 226a of the optical path adjusting member 226 with respect to the reference plane 80 is adjusted to reduce the speckle noise.

Figure 5:
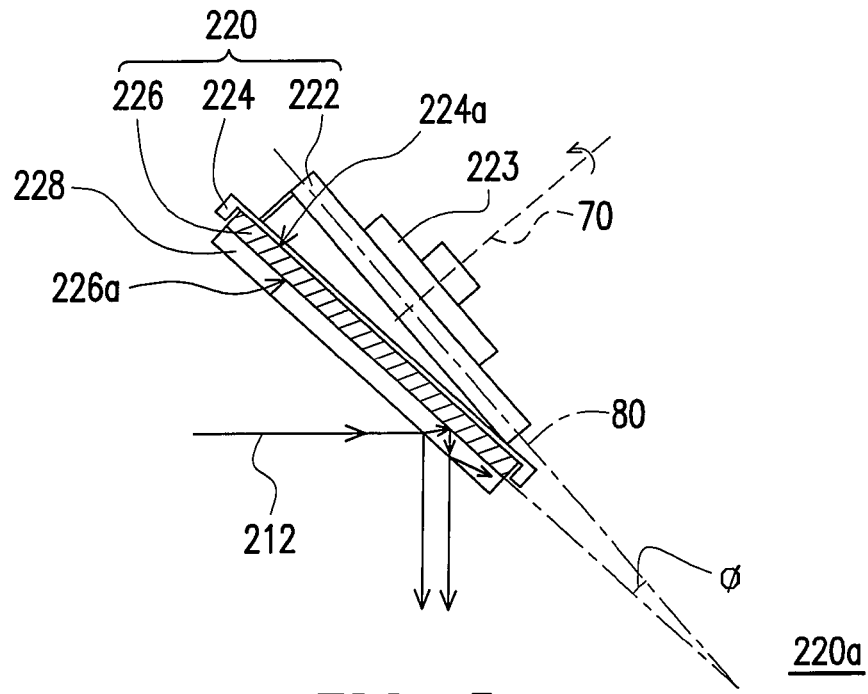
FIG. 5 is a schematic view of another speckle-reducing module according to another embodiment of the present invention.

As shown in FIG. 5, the speckle-reducing module 220a further includes a first optical plate 228 compared to the speckle-reducing module 220 in FIG. 2. The first optical plate 228 is disposed at the optical path adjusting member 226 and at the optical path of the light beam 212. The first optical plate 228 is adopted for reflecting a portion of the light beam 212 and making another portion of the light beam 212. pass through More specifically, the first optical plate 228 is a glass plate coated with a reflecting layer and the reflecting layer has a reflectivity for the light beam 212 of between 20% to 30%. By disposing the first optical plate 228 at the optical path adjusting member 226, the single light beam 212 is split into a plurality of light beams so that speckle noise is reduced even further.

Figure 6:
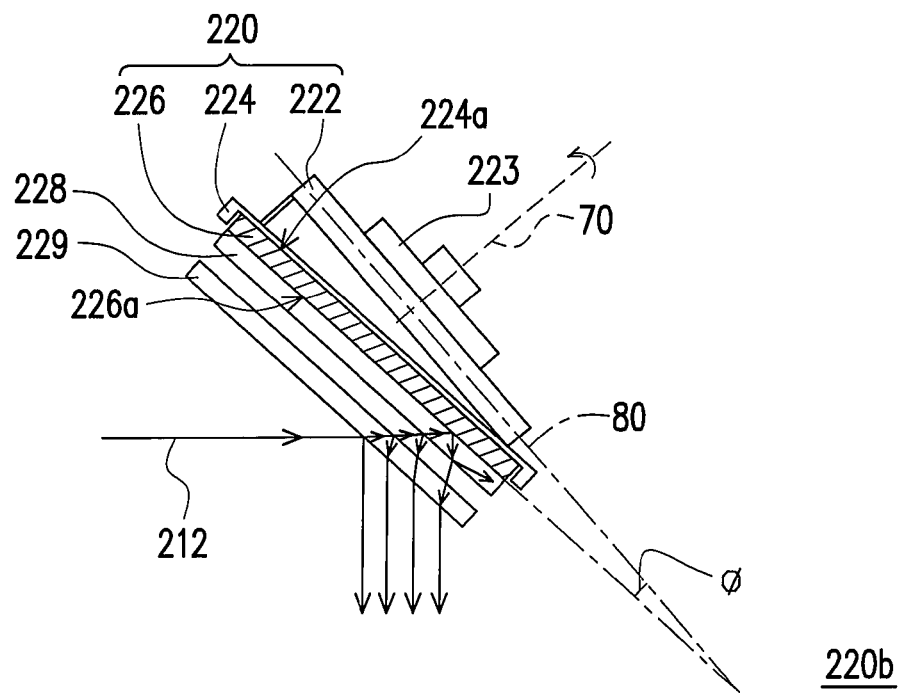
FIG. 6 is a schematic view of another speckle-reducing module according to another embodiment of the present invention.

As shown in FIG. 6, the speckle-reducing module 220b further includes a second optical plate 229 compared to the speckle-reducing module 220a in FIG. 5. The second optical plate 229 is disposed at a distance from the first optical plate 228 and at the optical path of the light beam 212. The second optical plate 229 is adopted for reflecting a portion of the light beam 212 and making another portion of the light beam 212 pass through. More specifically, the material of the second optical plate 229 is identical to the material of the first optical plate 228, for example. Because the second optical plate 229 is separated from the first optical plate 228 by a distance, not only is the light beam 212 split by the second optical plate 229 into a plurality of light beams, but the light beams that pass through the second optical plate 229 is also split into more light beams by the first optical plate 228. Consequently, speckle noise is further reduced.

Second Embodiment

Figure 7:
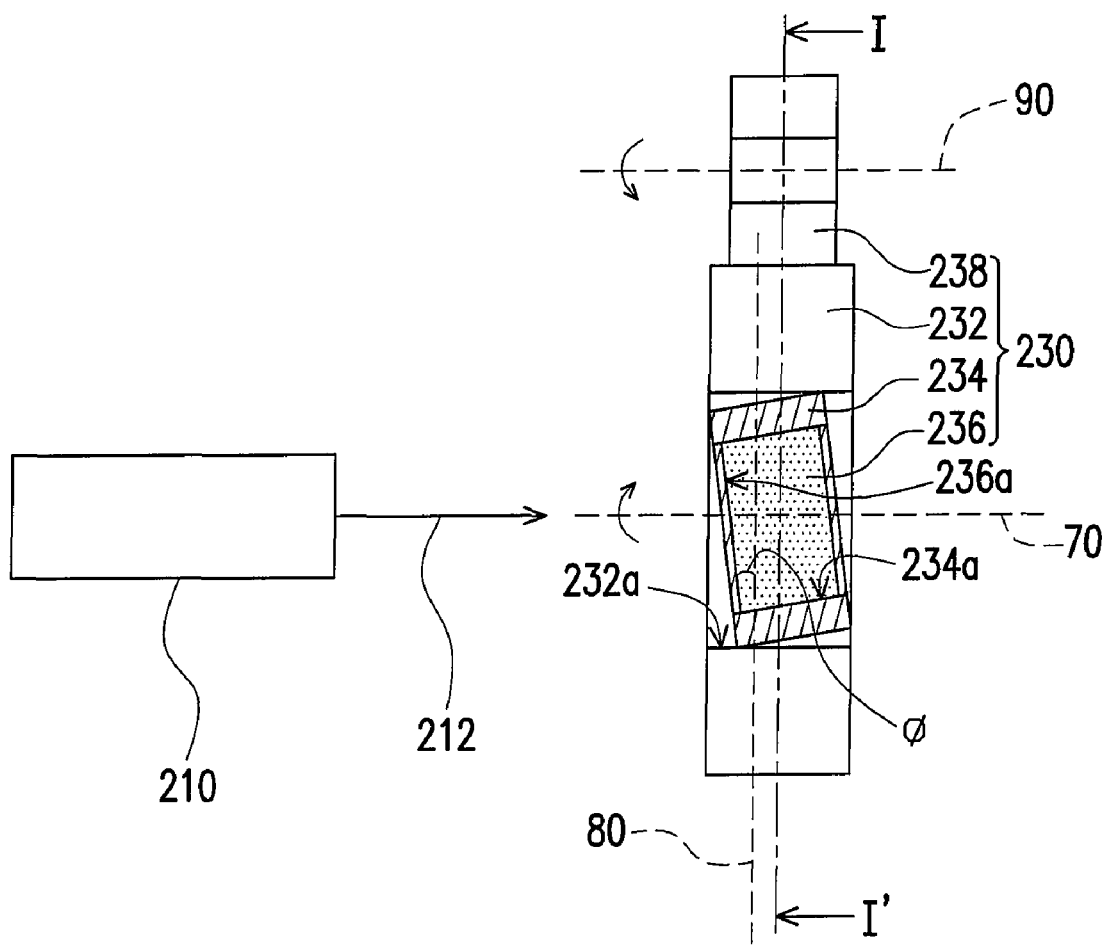
FIG. 7 is a schematic view of an illumination system according to a second embodiment of the present invention.
Figure 8:
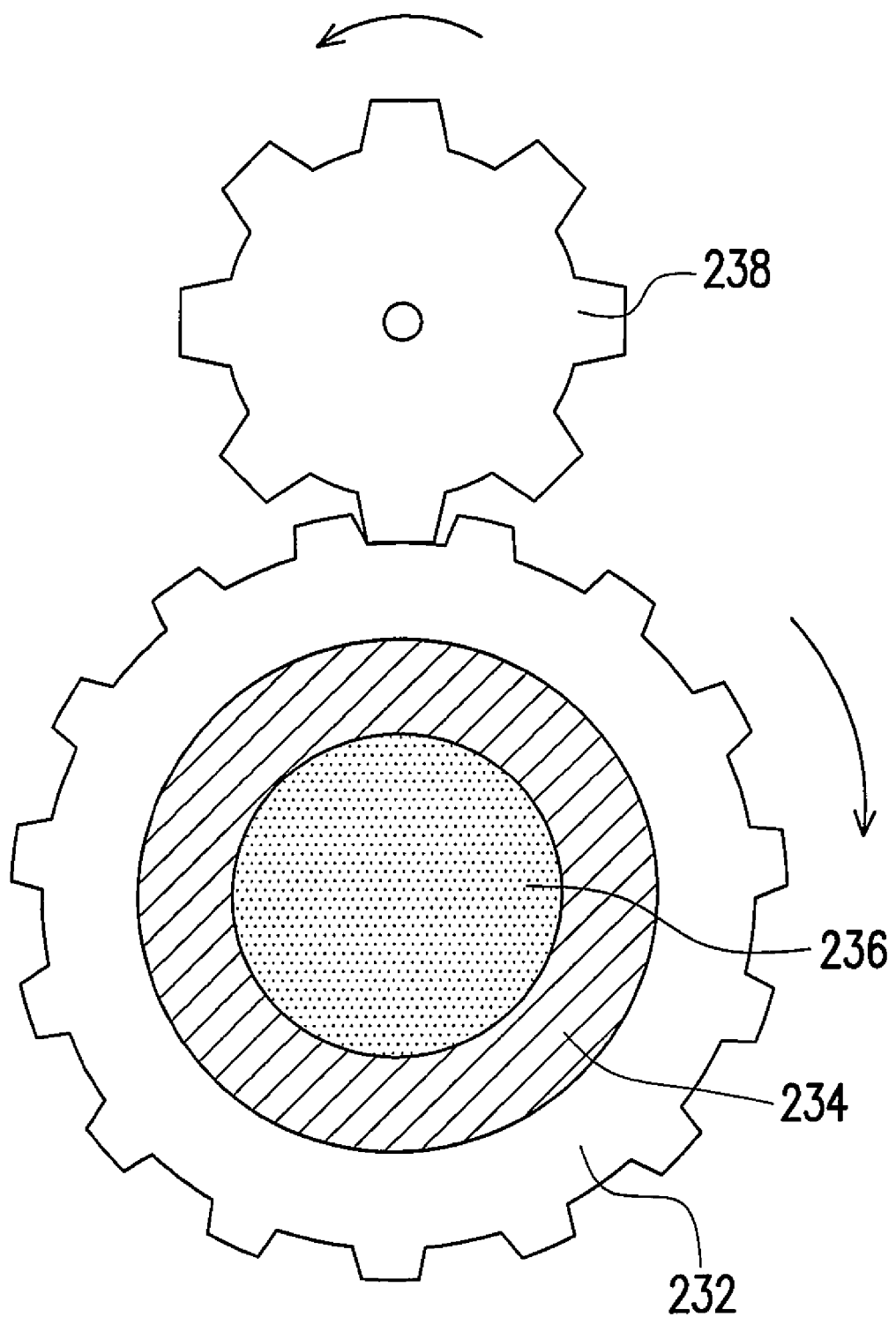
FIG. 8 is a schematic cross-sectional view along line I-I' of FIG. 7.

As shown in FIGS. 7 and 8, the illumination system 200' is similar to the illumination system 200 in FIG. 2 and their differences is in the design of the speckle-reducing module. In the illumination system 200', the rotator 232 of the speckle-reducing module 230 is a driven gearwheel, the carrier 234 is a bearing, and the optical path adjusting member 236 is a lens. An incident surface 236a is a surface of the lens and the incident surface 236a of the optical path adjusting member 236 is inclined at an angle φ with respect to the reference plane 80. In addition, the rotator 232 has a first spindle hole 232a, and the carrier 234 is disposed in the first spindle hole 232a. The carrier 234 is a bearing having a second spindle hole 234a, and the optical path adjusting member 236 is disposed in the second spindle hole 234a, for example.

In addition, the speckle-reducing module 230 further includes a driving gearwheel 238 meshed with the rotator 232. The driving gearwheel 238 is adopted for rotating about a spindle axis 90 and driving the rotator 232 to rotate about a spindle axis 70 on a reference plane 80. When the rotator 232 rotates, the carrier 234 is driven to rotate and the optical path adjusting member 236 is also driven to rotate with the carrier 234. Moreover, the carrier 234 is set to incline with respect to the reference plane 80 in the present embodiment so that the incident surface 236a of the optical path adjusting member 236 disposed on the carrier 234 is also inclined to the reference plane 80. Therefore, when the optical path adjusting member 236 rotates, the incidence angle of the light beam 212 incident upon the optical path adjusting member 236 changes. As a result, the location of the light beam 212 that projects on the light valve (not shown) after passing through the optical path adjusting member 236 also changes. Hence, the speckle noise can be reduced.

Since the advantages of the illumination system 200' in the present embodiment is similar to that of the illumination system 200, a detailed description is omitted.

It should be noted that the speckle-reducing modules 220 and 230 in the aforementioned embodiments are disposed before the light incident end of an integration rod (not shown) besides being disposed at the optical path of the light beam 212 passing through other optical members (for example, the integration rod) of the illumination systems 200 and 200' so as to reduce the volume of the speckle-reducing modules 220 and 230, increase illumination efficiency and minimize the speckle noise even further.

In summary, the illumination system of the present invention has at least one or more of the following advantages:

1. When the speckle-reducing module of the present invention operates, the location of the light beam projected on the light valve varies along a circular trace and the incidence angle also varies accordingly. Because the range of variation along the circular trace is larger and the light beam has angular variation characteristics, the illumination system of the present invention reduces speckle noise effectively.

2. The present invention requires only one actuator (i.e. motor) and there is no need for a complicated control circuit. Hence, the fabrication cost is reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising:
    a coherent light source for providing a light beam; and
    a speckle-reducing module, disposed in an optical path of the light beam, the speckle-reducing module comprising:
    a rotator for rotating on a reference plane about a spindle axis passing through the rotator, wherein the spindle axis is substantially perpendicular to the reference plane;
    a carrier, disposed on the rotator and capable of being rotated by the rotator;
    a reflecting member, disposed on the carrier and in the optical path of the light beam and capable of being rotated by the carrier, wherein the reflecting member is rotated about the spindle axis passing through the rotator, and the reflecting member has a reflecting surface inclined at an angle with respect to the reference plane;
    a first optical plate disposed on the reflecting member and in the optical path of the light beam, wherein the first optical plate is used for reflecting a portion of the light beam and making another portion of the light beam pass therethrough; and
    a second optical plate disposed at a distance from the first optical plate and in the optical path of the light beam, and the second optical plate is used for reflecting a portion of the light beam and making another portion of the light beam pass through.

2. The illumination system according to claim 1, wherein the rotator is a turntable of a motor.

3. The illumination system according to claim 1, wherein the coherent light source is a laser light source.

* * * * *